Oct. 11, 1955     W. LE B. GROENE     2,720,149
AUTOMOBILE AIR CONDITIONING DUCT SYSTEM
Filed Sept. 21, 1953     2 Sheets-Sheet 2
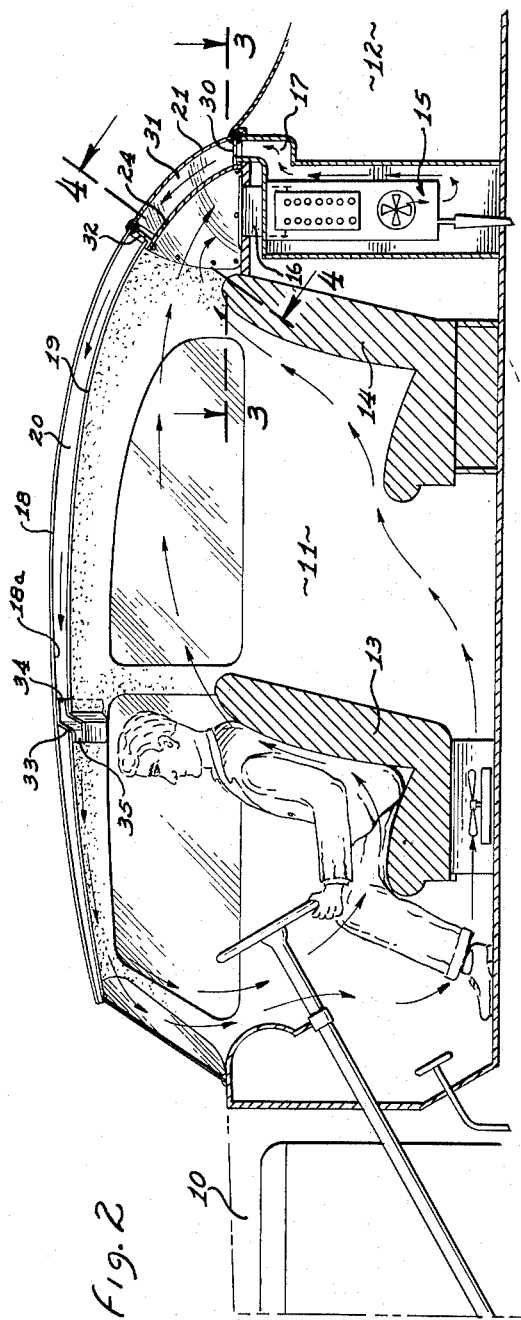
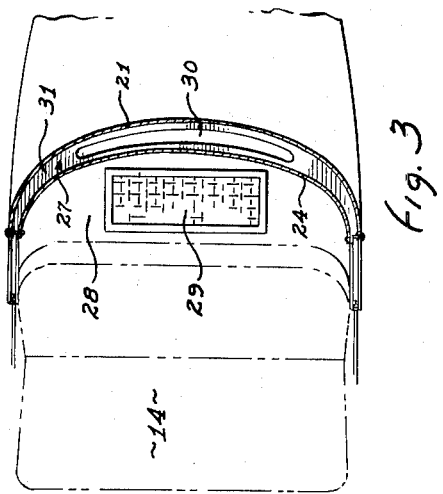
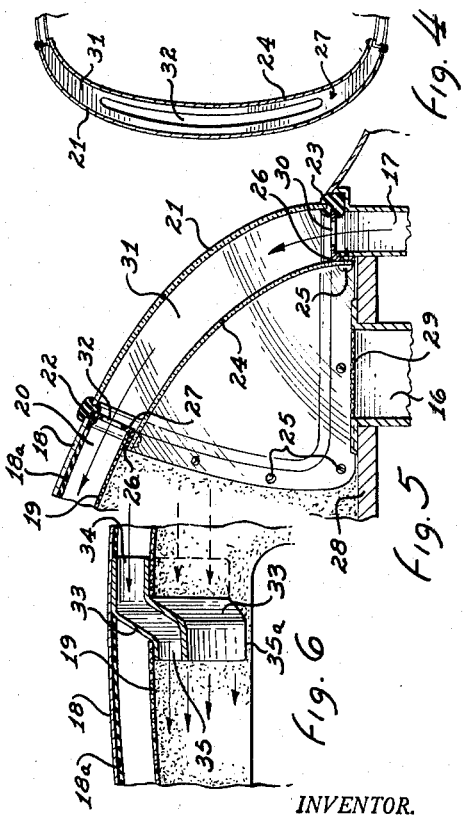
INVENTOR.
WILLARD LE BLOND GROENE.
BY
ATTORNEY.

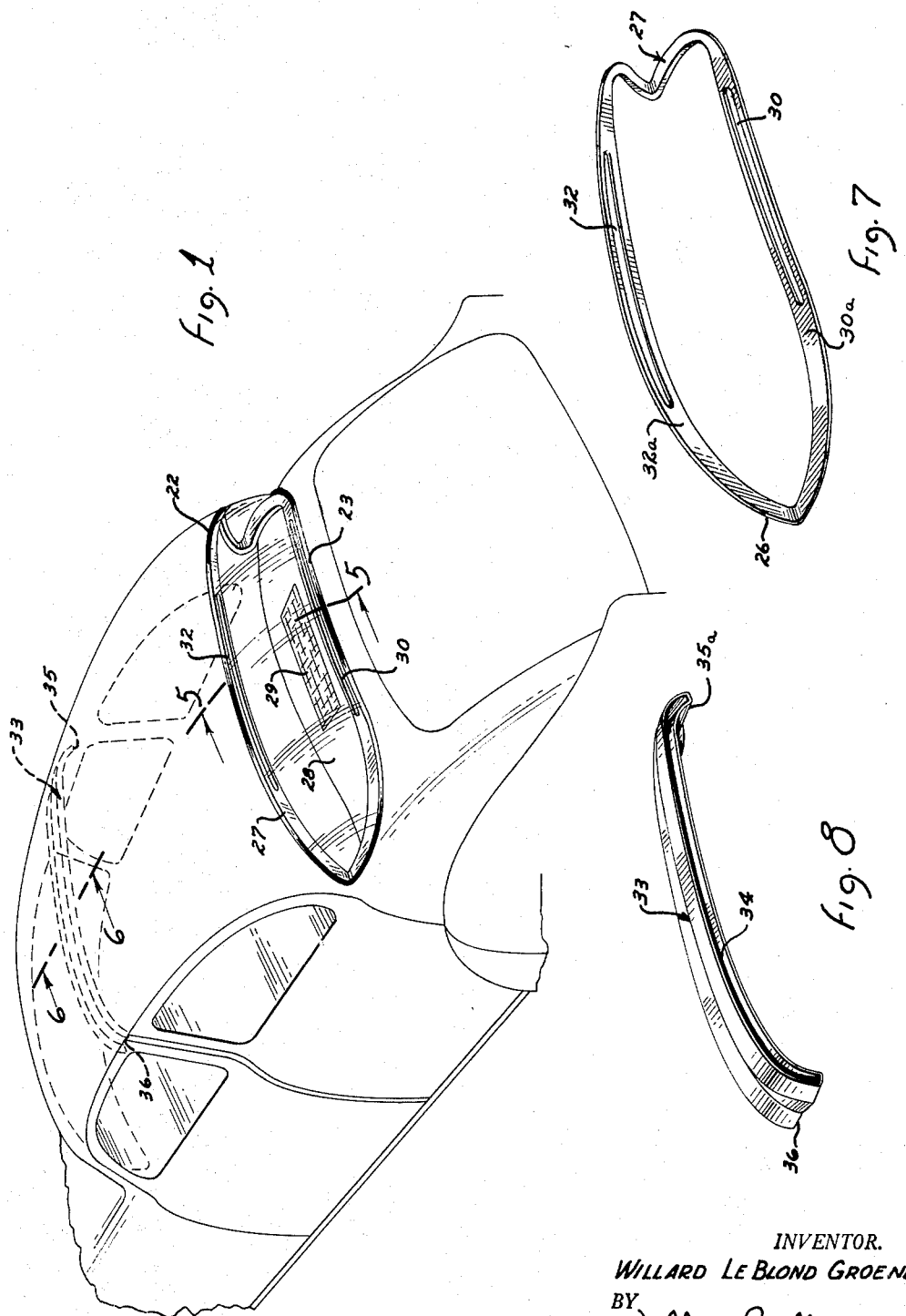

United States Patent Office 2,720,149
Patented Oct. 11, 1955

2,720,149

AUTOMOBILE AIR CONDITIONING DUCT SYSTEM

Willard Le Blond Groene, Phoenix, Ariz.

Application September 21, 1953, Serial No. 381,212

7 Claims. (Cl. 98—2)

This invention pertains to improvements in automobile air conditioning duct systems and is directed to certain improvements in the construction and arrangement of the cool air distributing ducts in automobile air conditioning systems such as shown in my co-pending patent application, Serial No. 313,260, filed October 6, 1952.

In present day motor cars having the evaporator or cooling coil unit in the trunk compartment it is found that the best arrangement is to have the intake air coming through a grill in the rear shelf behind the rear seat while the discharge cooled air is transmitted through a duct system to discharge outlets located above the front seat of the vehicle projecting the cooled air forwardly along the headlining toward the top portion of the windshield of the vehicle and then allowing the air to diffuse through the vehicle in the manner as fully outlined in the aforementioned pending patent application.

Because of these specific requirements for satisfactory performance, certain design and appearance problems present themselves. One of these problems is that of getting the cooled discharge air from the cooling unit in the rear deck up past the rear window without obscuring vision in any way through the rear window. In the most modern cars the rear window now goes completely from one side to the other of the vehicle so that there are no blind spots at the sides of the rear window. It is therefore essential that any air conditioning duct system meeting the above cited requirements must pass up in front of the rear window. This has led to various transparent duct arrangements, the most satisfactory of which is shown in the aforementioned co-pending patent application.

Such ducts, however, have a tendency to accumulate dust on their inner surfaces, despite the use of filters in the cooling air circulating system, particularly in the southwest desert regions where the extremely low humidity and dry air results in a static charge being developed on the inner surface of the plastic ducts by the air flow causing microscopic dust particles which get through the filters to adhere thereto and tend to obscure vision through the rear window.

Therefore, one of the objects of this invention is to provide an improved air conditioning duct system for discharging air forwardly above the front seat of the vehicle which does not obscure the rear window of the vehicle in any way.

Another object of this invention is to provide an arrangement whereby a double window is provided for the rear window which serves as a duct to transmit the cooling output air from the evaporator unit to a discharge outlet in the vehicle passenger compartment.

Still another object of this invention is to provide a double rear window forming a duct which is connected at its upper end to a discharge outlet communicating with the space between the top and the headlining of the vehicle which in turn serves for the forward transmission of the cooling air to a discharge outlet in the vehicle passenger compartment.

Still another object of this invention is to provide an improved duct system for a motor vehicle including a double rear window forming a cooling air discharge duct from the shelf in back of the back seat to the top of the frame of the rear window where it may be connected to a discharge member in the passenger compartment of the vehicle.

Still another object of this invention is to provide an improved automobile air conditioning system having a transverse discharge member located above the front seat and extending from one door top to the other completely across the underside of the top of the vehicle to form an air discharge slit opening discharging forwardly toward the top portion of and downwardly over the windshield of the vehicle.

Still another object of this invention is to provide an improved air conditioning apparatus wherein there is provided a rear double window forming a cooling air duct having an inside window panel removable for the double rear window frame for cleaning purposes or when no air conditioning is provided for the vehicle.

Still another object of this invention is to provide a double window for the rear window of an automobile forming a combined air conditioning duct for the cooling discharge air and a double storm window for winter use to prevent frosting of the rear window of the vehicle under cold weather operation.

Still another object of this invention is to provide an improved duct system for a motor vehicle having a rear window of double pane construction carried in a frame having an input opening in the bottom of the frame between the panes connected to the discharge cooling air duct of an air conditioning unit in the rear trunk of the vehicle and a second outlet opening in the top portion of the frame between the panes communicating with space between the headlining and top of the vehicle, together with a discharge outlet located above the front seat of the vehicle or forward of the rear window for discharge of cooled air into the vehicle passenger compartment.

Further features and advantages of this invention will appear from a detailed description of the drawings in which:

Fig. 1 is a general perspective drawing showing the arrangement and position of the essential elements of an automobile air conditioning duct system incorporating the features of this invention.

Fig. 2 is a fragmentary longitudinal section through the motor vehicle shown in Fig. 1, particularly showing the location of the automobile air conditioning duct system in the vehicle body.

Fig. 3 is an enlarged section on the line 3—3 of Fig. 2.

Fig. 4 is an enlarged section on the line 4—4 of Fig. 2.

Fig. 5 is an enlarged fragmentary section on the line 5—5 of Fig. 1.

Fig. 6 is an enlarged fragmentary section on the line 6—6 of Fig. 1.

Fig. 7 is a perspective view of the double rear window frame.

Fig. 8 is a perspective view of the cool air discharge member.

As exemplary of one embodiment of this invention, there is shown an automobile having a body comprising the engine compartment 10, the passenger compartment 11, and the rear deck or trunk compartment 12. In the passenger compartment 11 is mounted the usual front seat 13 and rear seat 14. In the rear trunk compartment 12 there is provided the usual evaporator coil cooling unit 15 which may be energized for cooling purposes in a manner such, for example, as shown in my above cited co-pending patent application or by any conventional apparatus of well known type, the details of which form no part of this particular invention. Suffice it to state that the cooling unit 15 has a warm air suction intake duct 16, and a cool air discharge duct 17.

The motor vehicle is provided with the usual top 18 and headlining 19, which headlining is preferably attached to the top 18 and any supporting ribs in a manner to provide a passageway 20 between the top 18 and the headlining 19 by any suitable fastening arrangement. Suitable insulating and sound deadening material 18a may be applied to the underside of the top 18. The usual rear window 21 is mounted in a conventional rubber gasket frame fixed to the vehicle body and having the upper portion 22 and lower portion 23, Fig. 5. A second inside window pane or panel 24 is demountably secured by suitable screws 25 to a mounting surface or flange 26 on a frame 27 attached to and rigidly secured to the body of the vehicle adjacent the rubber gasket frame 22—23.

The rear shelf 28 behind the rear seat 14 is provided with a warm air intake grill 29 which is connected to the warm air intake duct 16 of the evaporator unit 15. Adjacent the inside of the lower portion 23 of the rubber gasket frame 22—23 for the outside rear window 21 there is formed a transverse slot or discharge opening 30 in the bottom member 30a of the frame 27 which is in communication with the cool air discharge duct 17 of the evaporator unit 15 so that cooling air discharges into the space 31 between the outside rear window 21 and the inside window panel 24.

Adjacent the upper portion 22 of the rubber gasket frame 22—23 there is formed an outlet opening 32 in the top member 32a of the frame 27 which discharges the cooling air passing through the space 31 between the pane 21 and the inside panel 24 into the space 20 between the headlining 19 and the top 18 of the motor vehicle.

Discharge air from the space 20 is transmitted out through a discharge member 33 as best shown in Figs. 2, 6 and 8, having an intake opening 34 facing rearwardly to receive the cooling air from the space 20 between the headlining 19 and top 18 and to discharge this air forwardly toward the windshield out through a slotted discharge opening 35. The discharge member 33 may extend from the top of the door openings of the body as indicated at 35a and 36, Fig. 1, completely up and across the underside of the top and headlining, so as to form a slit opening 35 to transmit a sheet of cooling air at low velocity but high volume forwardly toward the windshield of the vehicle.

It will be noted that the vehicle normally supplied by the factory would be provided with the rear window 21 and the frame 27 with the bottom inlet opening 30 and the top outlet opening 32 normally opening into the space 20 between the usual headlining 19 and top 18 of the motor vehicle, together with the mounting flange 27 for application of the inside window panel. The discharge member 33 could be arranged as an accessory easily applied to the vehicle received from the factory with the normal headlining 19 going straight through uninterrupted to the top of the windshield in those cases where no air conditioning was to be provided for the vehicle. Under these conditions the inside window panel 24 would not be supplied so that the automobile could be sold in a conventional manner without any air conditioning provided.

When a customer would order air conditioning, however, or when it was to be installed at a later date in the vehicle it would merely be necessary to install the discharge member 33 and to secure the inside window panel 24 to the abutment surface or mounting flange 26 of the frame 27, and then put the unit 15 in the rear compartment and hook up ducts 16 and 17 and the vehicle would then be ready for air conditioning at a minimum of expense and trouble.

It will be noted that any dust which would normally accumulate on the inside surfaces of the window 21 and window panel 24 in the space 31 between the panes could be easily removed by simply demounting the inside window panel 24, which could preferably be made of suitable plastic type window material, and the surfaces wiped and the inside window panel 24 quickly and easily reinstalled, as shown in Fig. 5. Thus, no dust would be allowed to accumulate to a point where it would in any way interfere with clear vision out of the rear of the vehicle. Further, it will be noted that the over-all appearance of the car is substantially unaltered when an air conditioning duct system of this type is installed. The double rear window arrangement for all visual purposes is the same whether or not the panel 24 has been installed for air conditioning. The other discharge element 33 likewise is so positioned out of the way of both the passengers and visual inspection that it likewise would not in any way change or detract from the appearance of the vehicle while at the same time giving the most desired results of the discharge of air at the critical location mentioned.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters patent is:

1. In an air conditioning duct system for an automobile body having a passenger compartment with a top and a headlining, a trunk compartment, a rear seat in said passenger compartment, a rear shelf behind said rear seat, a cooling unit in said trunk compartment under said shelf, a warm air intake duct on said cooling unit, a cool air discharge duct on said cooling unit, a warm air intake grill in said shelf connected to said intake duct, a window frame fixed in said body, a double rear window in said frame, a discharge opening in the bottom of said frame opening into the space between the panes of said double window connected to said discharge duct of said cooling unit, an outlet opening in the top portion of said frame communicating with said space between said panes, and a discharge member connected to said outlet opening through the space between the top and headlining to discharge cooling air into said passenger compartment.

2. In an air conditioning duct system for an automobile body having a passenger compartment with a top and a headlining, a trunk compartment, a rear seat in said passenger compartment, a rear shelf behind said rear seat, a cooling unit in said trunk compartment under said shelf, a warm air intake duct on said cooling unit, a cool air discharge duct on said cooling unit, a warm air intake grill in said shelf connected to said intake duct, a double rear window including a frame fixed in said body, an outside rear window pane fixed in said frame, a demountable inside window panel mounted in said frame, a discharge opening in the bottom portion of said frame opening between said pane and panel and connected to said discharge duct of said cooling unit, a discharge opening in the upper portion of said frame opening between said pane and panel connected to discharge cooling air into the space between the top and headlining of said passenger compartment, and a discharge member communicating with said space between said top and headlining to direct cooling air into said passenger compartment in a horizontal forward direction toward the windshield from a position immediately forward of the top of the back of the front seat.

3. In an air conditioning duct system for an automobile body having a passenger compartment, a trunk compartment, a rear seat in said passenger compartment, a rear shelf behind said rear seat, a cooling unit in said trunk compartment under said shelf, a warm air intake duct on said cooling unit, a cool air discharge duct on said cooling unit, a warm air intake grill in said shelf connected to said intake duct, a double rear window including a frame fixed in said body, an outside rear window pane fixed in said frame, a demountable inside window panel mounted on said frame, a discharge opening in the bottom portion of said frame between said pane and panel connected to said discharge duct of said cooling unit, a discharge opening in the upper portion of said frame between said pane and panel connected to discharge cooling air into the space between the top and headlining of said body, and a discharge member connected to said space between said top and headlining to direct cooling air into said passenger compartment.

4. In an air conditioning duct system for an automobile body having a passenger compartment, a trunk compartment, a rear seat in said passenger compartment, a rear shelf behind said rear seat, a cooling unit in said trunk compartment under said shelf, a warm air intake duct on said cooling unit, a cool air discharge duct on said cooling unit, a warm air intake grill in said shelf connected to said intake duct, a double rear window including a frame fixed in said body, an outside rear window pane fixed in said frame, a demountable inside window panel mounted on said frame, a discharge opening in the bottom portion of said frame between said pane and panel connected to said discharge duct of said cooling unit, a discharge opening in the upper portion of said frame between said pane and panel connected to discharge cooling air into the space between the top and headlining of said body, a discharge member connected to said space between said top and headlining to direct cooling air into said passenger compartment, said discharge member extending from the top of the door openings up and across the under side of the top of said body.

5. In an air conditioning duct system for an automobile body having a passenger compartment including a top and a headlining, a trunk compartment, a rear seat in said passenger compartment, a rear shelf behind said rear seat, a cooling unit in said trunk compartment under said shelf, a warm air intake duct on said cooling unit, a cool air discharge duct on said cooling unit, a warm air intake grill in said shelf connected to said intake duct, a double rear window including a frame fixed in said body, an outside rear window pane fixed in said frame, a demountable inside window panel mounted on said frame, a discharge opening in the bottom portion of said frame between said pane and panel connected to said discharge duct of said cooling unit, a discharge opening in the upper portion of said frame between said pane and panel connected to discharge cooling air into the space between the top and headlining of said body, and a transverse discharge member in communication with said space between said headlining and top having a forwardly discharging slit extending from the top of the door openings across the underside of said headlining.

6. In an air conditioning duct system for an automobile body having a passenger compartment including a top and a headlining, a trunk compartment, a rear seat in said passenger compartment, a rear shelf behind said rear seat, a cooling unit in said trunk compartment under said shelf, a warm air intake duct on said cooling unit, a cool air discharge duct on said cooling unit, a warm air intake grill in said shelf connected to said intake duct, a double rear window including a frame fixed in said body, an outside rear window pane fixed in said frame, a demountable inside window panel mounted on said frame, a discharge opening in the bottom portion of said frame between said pane and panel connected to said discharge duct of said cooling unit, a discharge opening in the upper portion of said frame between said pane and panel connected to discharge cooling air into the space between the top and headlining of said body, and a transverse discharge member in communication with said space between said headlining and top having a forwardly discharging slit extending from the top of the door openings across the underside of said headlining and located above the front seat of said vehicle.

7. In an air conditioning system for an automobile body passenger compartment comprising a rear seat compartment and a front seat compartment, a top, a rear seat having a back, a front seat having a back forming with said top and sides of the body a passageway interconnecting the rear seat compartment with the front seat compartment, and a windshield and dashboard at the front of said front seat compartment, a cooling air circulating system characterized by a discharge duct having a continuous slit opening extending from side-to-side of said body along the upper edge of said passageway adjacent the underside of the top and positioned immediately in front of said passageway, said slit being adapted to transmit a continuous horizontal sheet of cooling air extending between the sides of the body and directed forwardly toward said windshield, means for supplying cooling air to said discharge duct, and an intake duct in said rear seat compartment adapted to cause return air to move rearwardly through the entire cross sectional area of said passageway.

References Cited in the file of this patent
UNITED STATES PATENTS

| | | |
|---|---|---|
| 2,083,059 | Fageol | June 8, 1937 |
| 2,250,618 | Austin | July 29, 1941 |
| 2,286,758 | Nelson | June 16, 1942 |
| 2,294,036 | Kettering | Aug. 5, 1942 |
| 2,295,750 | Norris | Sept. 15, 1942 |